June 17, 1930. J. B. FREYSINGER 1,764,438
LATCH CONTROLLING MECHANISM
Filed Dec. 7, 1928
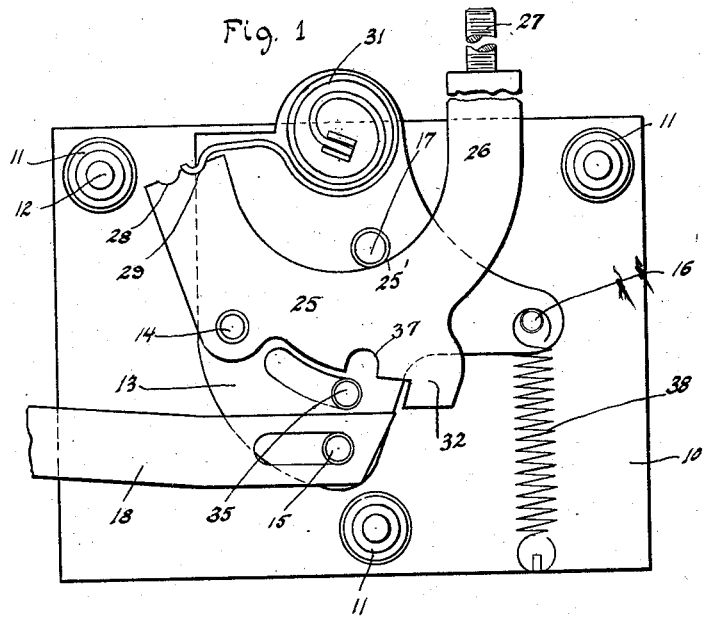
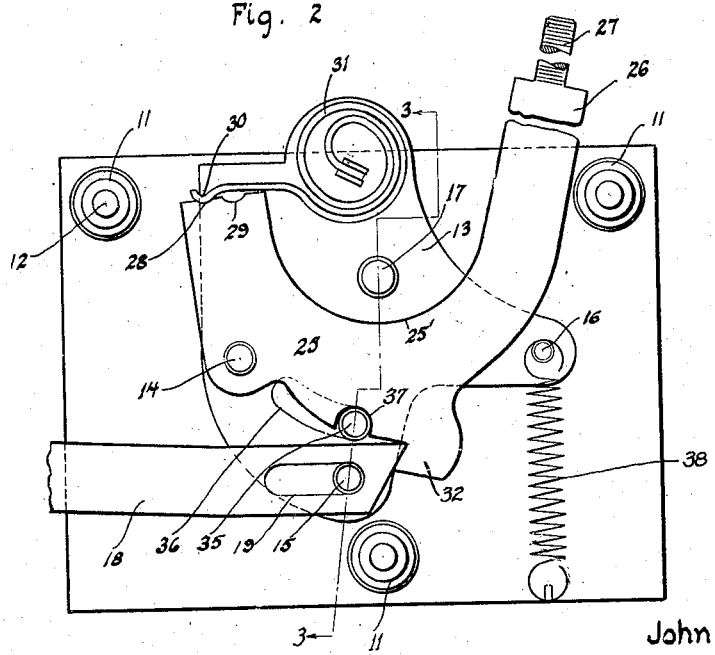
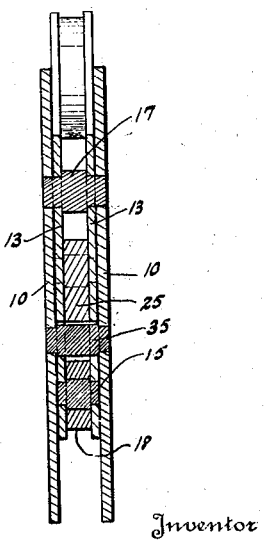
Inventor
John B. Freysinger
By W. Clay Lindsey
His Attorney Patented June 17, 1930

1,764,438

UNITED STATES PATENT OFFICE

JOHN B. FREYSINGER, OF NEW BRITAIN, CONNECTICUT, ASSIGNOR TO NORTH AND JUDD MANUFACTURING COMPANY, OF NEW BRITAIN, CONNECTICUT, A CORPORATION OF CONNECTICUT

LATCH-CONTROLLING MECHANISM

Application filed December 7, 1928. Serial No. 324,372.

This invention relates generally to latch controlling mechanisms of the sort adapted for use on automobile doors and the like, and the invention has particular reference to a mechanism for controlling a latch mechanism at a point remote from the latter.

The aim of the present invention is to provide an improved arrangement which is characterized by its simplicity in construction and arrangement in that it comprises but a relatively few number of parts which may be economically manufactured and assembled; which is characterized by its strength and durability; and which is characterized by the ease and facility with which it may be operated.

A further aim of the invention is to provide a remote control mechanism for latches of automobile doors and the like which may be interchangeably used on either right hand or left doors irrespective of the direction in which the doors swing, thus permitting the requirements and demands of the various doors of an automobile to be met from a single stock of such mechanisms.

A still further aim of the invention is to provide a mechanism of this sort with a handle through which the latch may be actuated, and means associated with a handle for locking the latch in latching position.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown for illustrative purposes one of the many embodiments which the present invention may take:

Figure 1 is a side view of my improved mechanism, a side plate of the casing or frame, and one of the plates of the pivoted assembly being removed and the parts of the mechanism being shown in neutral position;

Fig. 2 is a view similar to Figure 1 but showing the operating handle as having been moved to a position where the latch is locked in latching position; and Fig. 3 is a transverse sectional view taken substantially on line 3—3 of Figure 1.

Referring to the drawings in detail, my improved remote control mechanism is shown as having a casing or stationary frame composed of a pair of like side plates 10 suitably held in spaced apart relation by rivets or studs 11. These studs have openings 12 which are preferably countersunk or counterbored at both ends so that the screws which are employed for securing the mechanism to the automobile door may be passed through these openings in either direction depending upon which side of the casing is to engage against the door. Mounted within the casing comprising the plates 10 is a pivoted element, frame or rocking assembly which comprises a pair of like plates 13 secured together in spaced relation by rivets 14, 15 and 16. These plates abut against the respective plates 10 and are pivoted or journaled on a pivot or pin 17. This pin is supported by the plates 10 as may be seen most clearly from Figure 3. The pivoted assembly or element comprising the plates 13 is in effect a lever. It may be associated with the latch mechanism by means of a member or link 18. In my copending application, Serial No. 314,422, filed October 23, 1928, for Automobile door latch mechanisms, I have shown the manner in which a member corresponding to the reciprocating member or link 18 may be associated with a particular form of latch mechanism. The link has one end positioned between the plates 13 and is provided with an elongated slot 19 through which extends, and in which is adapted to move, the stud 15.

Pivotedly carried by the pivoted assembly is an actuating member through which said link 18 is adapted to be actuated, and associated with this actuating member is means for locking or fastening said link and the latch associated therewith in latching position. This actuating member, in the present illustrative disclosure of the invention, has a flat body portion 25 of generally U-shape and positioned between the plates 13 of the pivoted assembly. One arm of this actuating member is extended upwardly so as to form a handle 26 which may terminate in a threaded stud 27 on which a knob or the like is adapted to be screwed. The knob is not shown in the present instance. The actuating member is pivoted on the stud 14, which is positioned to that side of the pivoted pin 17 opposite to that of the handle 26. The other arm of the actuating member terminates in an edge which has the two notches 28 and 29 in which the humped end 30 of a spring 31 is adapted to engage. This spring is carried by and mounted within the pivoted assembly and serves to resiliently hold the actuating member in two of its positions.

According to the present illustrative disclosure of the invention, the means for fastening the link 18 and the latch associated therewith in latching position is fixed to or carried by the actuating member 25. This means may be in the form of a pawl or tooth 32 depending from the actuating member 25 and preferably formed integral therewith. This pawl is adapted to take in behind the rear or right hand end of the link 18 to lock the same when the actuating lever is moved to the position shown in Figure 2. Pivotal movement of the rocking assembly is limited by means of a stud 35 carried by the plates 10 and extending through arcuate slots 36 in the plates 13. The stud 35 also limits the extent of movement of the actuating member in a clockwise direction, as will be seen from Figure 2. The lower edge of the actuating member 25 has a notch 37 which is adapted to receive the stud 35 when the actuating member is in the position shown in Fig. 2.

The operation of my improved arrangement will now be briefly described. The forward end of the link 18 will be properly associated with the latch mechanism; for example, it may be connected to a selected roll-back of that mechanism as shown in my said co-pending application, Serial No. 314,422. When the parts are in the neutral position as shown in Figure 1, the latch may be retracted by turning the operating handle with which the latch mechanism is associated. When that handle is so operated, the rear end of the link 18 is moved backwardly on the stud 15 without affecting the control mechanism. If it is desired to retract the latch from the inside of the door, this may be done by moving the handle 26 forwardly; that is, to the left, referring to Fig. 1. When this handle is so turned, the pivoted assembly with the parts carried thereby are turned counter-clockwise, and, owing to the engagement of the stud 15 against the rear end of the slot 19, the link 18 will be retracted and the latch with it. It will be noted that when the handle 26 is thus turned, the edge 25' of the actuating member is fulcrumed on the stud 17, as shown in Figure 1. When the handle is released, the pivoted assembly is brought back to neutral position by a spring 38, one end of which is fastened to the plates 10 and the other end of which is hooked about the stud 16 carried by the plates 13. When it is desired to lock or fasten the latch against actuation by the outside handle or lever of the latch mechanism, this may be done by turning the handle 26 clockwise from the position shown in Figure 1 to that shown in Figure 2. When the handle or actuating member is so moved the pawl 32 carried thereby is engaged behind the link 18. The actuating member is resiliently held in this position by the engagement of the hook end 30 of the spring 31 in the notch 28.

When the parts are in the position shown in Fig. 2, and an attempt is made to withdraw the latch by turning the operating handle of the latch mechanism, the link will be urged towards the right and tend to turn the actuating member 25 back to the neutral position shown in Fig. 1. The actuating member cannot be so turned, because, when the actuating member is in the position shown in Fig. 2, the stud 35 is engaged in the notch 37. When it is desired to unlock the latch, this may be done by merely turning the actuating handle of the remote control mechanism back to the neutral position shown in Fig. 1.

It will be observed that the remote control mechanism may be used on either left or right hand doors and on doors that swing either rearwardly or forwardly. It is understood, of course, that the terms employed herein to express directions of movements of the parts, (such as clockwise, left, right) are used by way of illustration only.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A latch controlling mechanism including a reciprocating member through which the latch is operated, a pivoted assembly associated with said member and adapted to actuate said member when the assembly is turned in one direction, an actuating member having a limited movement with respect to said assembly and adapted to turn the same to retract the latch when turned in one direction, and means carried by and movable with said actuating member and adapted to directly engage said reciprocating member to lock the same against actuation when said actuating member is moved in the opposite direction.

2. A latch controlling mechanism including a reciprocating member, a pivoted assembly through which said member is retracted when the assembly is turned in one direction, an actuating lever having a limited movement with respect to said assembly, means carried by and movable with said actuating member and adapted to engage behind said reciprocating member to lock the same against actuation; said lever when turned in one direction being adapted to turn said assembly, and when turned in the opposite direction being adapted to move said latching means behind said reciprocating member, and means for resiliently holding said actuating member in position.

3. A latch controlling mechanism including a fixed frame, an element pivoted therein for limited movement relative thereto, a member through which said pivoted element is adapted to actuate the latch, an actuating lever provided with a handle and having a limited movement with respect to said element and adapted, when moved in one direction, to turn the same to retract the latch; and a pawl fixed to said actuating lever and adapted to engage behind said member to lock the same in position when said lever is turned in the opposite direction.

4. A latch controlling mechanism including a pivot, a plate pivoted thereon, a link, a pin and slot connection between said link and plate, an actuating lever pivoted to said plate at a point spaced from said pivot and adapted to engage said pivot when said lever is turned in one direction from neutral position, and a pawl on said lever adapted to engage behind said link when said lever is turned in the opposite direction from neutral position.

5. A latch controlling mechanism including a fixed frame, an element pivoted therein for limited relative movement, a member through which said element is adapted to actuate a latch, a stud carried by said fixed frame, and an actuating lever pivoted to said element and having a pawl adapted to engage behind said member when said lever is brought to a predetermined position, said lever having a notch adapted to receive said stud when said lever is in said position.

6. A latch controlling mechanism including a fixed frame, a pivot carried thereby, a rocking frame comprising a pair of spaced plates journaled on said pivot, a stud carried by said fixed frame, said plates having slots adapted to accommodate said stud, a link, a pin and slot connection between said link and plates, a lever pivoted to said plates and adapted to fulcrum on said pivot when said lever is moved in one direction from a neutral position, a tooth carried by said lever adapted to engage behind said link when said lever is moved in the other direction, said lever having a notch adapted to receive said stud, means for resiliently holding said lever in position with respect to said rocking frame, and a spring normally urging said rocking frame to inoperative position.

JOHN B. FREYSINGER.